March 2, 1965  F. KOHLER  3,171,940
TUBE WELDING BY USE OF INDUCTION HEATING
Filed Sept. 17, 1962  2 Sheets-Sheet 1

March 2, 1965          F. KOHLER          3,171,940

TUBE WELDING BY USE OF INDUCTION HEATING 3,171,940
TUBE WELDING BY USE OF INDUCTION
HEATING
Fred Kohler, New York, N.Y., assignor to American Machine & Foundry Company, New York, N.Y., a corporation of New Jersey
Filed Sept. 17, 1962, Ser. No. 224,128
7 Claims. (Cl. 219—8.5)

This invention relates to methods and apparatus for the welding of metal elements such as tubing by high frequency alternating electric currents induced on such elements and more particularly to methods and apparatus for continuously producing a longitudinally welded seam in metal tubing by induction welding.

A commonly known method of longitudinally welding metal tubing by the use of high frequency induction heating, involves placing a coil around the outside of the tubing as the latter is advanced in a form having a longitudinally-extending V-shaped gap, the coil being placed upstream from the point where the apex of the gap occurs, viz. the welding point, at which the edges of the gap are forced together under pressure to form the weld. With this arrangement, the surrounding coil induces current to flow along a path which may be referred to as starting for example from a point on one edge of the gap, thence circumferentially around on the walls of the tubing to the other edge of the gap, thence along one edge of the gap to the weld point and back along the other edge of the gap to the starting point.

One of the disadvantages of this commonly known method is that it is difficult to place the induction heating coil as close to the weld point as would be desirable because of the physical presence of the pressure rollers which are used to engage the advancing tubing for closing the gap at the weld point. And if the coil cannot be placed fairly close to the weld point, then those portions of the current paths which extend along the gap as above referred to, will be excessively long, and the longer interval of heating the gap edges will permit an excessive amount of the current to be thermally conducted away from the edge surfaces of the gap which are the only portions of the metal to be usefully heated for welding.

However, in accordance with the present invention, the induction heating coil, instead of being positioned in the usual way so as to surround the advancing tubing, is instead mounted to extend circumferentially around adjacent the inside wall surfaces of the tubing. Accordingly, with this arrangement of an internal coil, same may be placed as close as desired to the point where the gap edges are squeezed together and without any possibility of mechanically or inductively interfering with the squeeze rollers, which are located, of course, entirely outside of the tubing.

Another disadvantage of the known induction heating method with an external coil as above referred to, arises in some cases from the fact that unless special expedients involving the use of an internal impeder are used, the efficiency of the arrangement is unsatisfactory because a part of the current induced and flowing around on the outside surface of the tube, also flows on the inside surfaces where it produces unnecessary losses and also increases the losses produced around the outside of the tubing. From examination of U.S. patent to Kohler No. 3,037,105, and FIG. 2 thereof in particular as there described, it will be apparent that under certain conditions commonly met with, with an external induction heating coil for tube welding, there will be wasteful flows of current in opposite directions respectively on the inside and outside surfaces of the tubing. Although losses in this respect may be minimized by the use of an internal impeder in the tube, as taught in that patent, there are various situations involving the welding of tubing of certain sizes where such a use of an impeder is difficult.

By placing the induction heating coil internally of the tube in accordance with this invention, the conditions of magnetic coupling between the coil and the tube metal will generally be satisfactory, particularly with tubing of large sizes, while still leaving the surfaces of the coil adequately spaced from the surfaces of the tubing to afford reasonable and proper mechanical clearance between the two. That is, if the ratio of the coil diameter to the diameter of the workpiece approaches "one," the coupling problem is facilitated. This can be the case when the coil is placed inside the tubing and this affords a substantial advantage in the welding of tubing of larger sizes. On the other hand, if said ratio is small, the coupling losses increase if proper clearance is to be maintained.

In accordance with the present invention, the internal coil arrangement will operate quite satisfactorily in many cases without going to the trouble or expense of using an internal impeder, yet in some cases, the use of an impeder internally of such internal coil has some significant advantage for the following reason. That is, the current flowing on the conductor of such an internal coil will normally tend to be more concentrated around on that part of the metal of the conductor which is nearest the axis of the coil, whereas for purposes of best coupling with the metal of the tubing, it would be preferable to have more of the current flow around on the external portions of the conductor nearest the interior walls of the tubing. And by placing an impeder in such an internal coil, this latter condition is facilitated.

One important advantage of the use of an internal coil in accordance with this invention is that since the current will be induced thereby on the inner surfaces of the tubing, substantially all of this current will flow along the edges of the V gap and very little of it will flow around on the outside of the tubing because, with no coil turns on the outside, the impedance on the outside surfaces will ordinarily remain very high. It has been proposed, for example in U.S. Patent to Body No. 2,632,079, to place an induction heating coil turn internally of the advancing tubing, but for use in combination with an external coil preferably located somewhat closer to the weld point. However, such an arrangement, due to the presence of the external coil, will greatly decrease the impedance to the flow of currents around on the outside surface of the tube with the consequence of producing unnecessary flows of current on both the internal and external tube surfaces with consequent serious losses. Also in this arrangement with both internal and external coils as heretofore proposed, currents would flow in the same direction around on both the internal and external tube surfaces, further contributing to unnecessary losses. Also, it will be apparent that with any arrangement involving induction coils both internal and external of the tubing, particularly if the external coil is close to the weld point, one cannot obtain the very important advantage of using an internal coil alone, as above explained, whereby the internal coil may be placed as close as desired to the weld point without interfering with the squeeze rolls. In fact in the usual case in accordance with the present invention, the internal coil may be placed so close to the weld point, that if an external coil were attempted to be used at the same location and formed of a conductor, or having a cross-section of the same size, this would be impossible because of conflict or lack of adequate clearance inductively or mechanically or both with the approaching peripheral portions of the rollers just in advance of the weld point.

Since the paths of the heating current on the gap edges may be made very short in accordance with this invention, the invention is particularly desirable for the welding of tubing of high electrical and thermal conductivity, such as aluminum and some classes of copper or copper alloys, as well as ferrous metals and alloys thereof. A short heating path with intense heating current is important, particularly with metals of high thermal conductivity in order that the edges to be welded may be so quickly heated to welding temperature that little heat is lost and dissipated by thermal conduction away from the weld line where the heat would be wasted or cause excessive softening of the metal where it should remain quite firm to enable the edges to be forcefully pressed together at the weld point.

The present invention utilizes an internal coil is physically particularly advantageous for use in the welding of individual discontinuous pieces of tubing of finite length inasmuch as it is possible to bring the heating coil so close to the weld point that the path of heating on the approaching gap edges will be unusually short, thereby minimizing what would otherwise be unwelded portions of the seam line at the beginning and at the end of each piece to be welded. When the two pieces to be welded are of finite length, same may be held and conveyed while passing the weld point in various of the ways disclosed in the co-pending U.S. application of Fred Kohler, Wallace C. Rudd and Robert J. Stanton, Serial No. 171,936, filed February 8, 1962. (In that application, among various ways disclosed for obtaining the welding heat, an internal induction heating coil is disclosed, but not claimed per se, at least apart from the combinations of features comprising the joint inventions of that application.)

Various further and more specific objects, features and advantages of the invention will appear from the description given below, taken in connection with the accompanying drawings, illustrating by way of example preferred forms of the invention.

Figure 1:
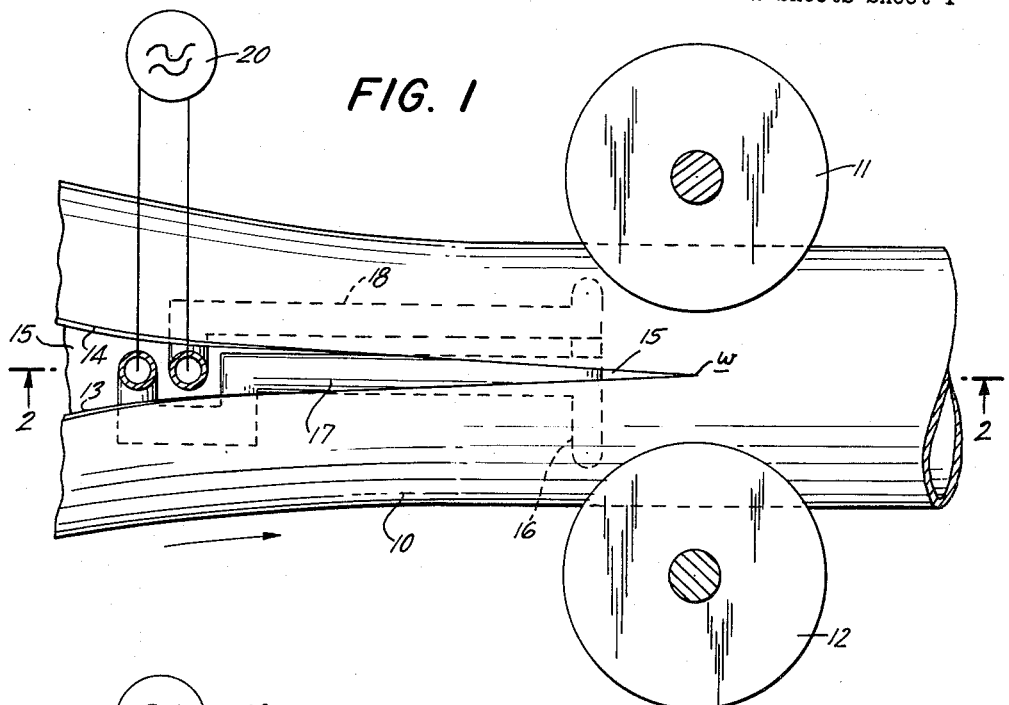
FIG. 1 is a plan view somewhat schematically showing one embodiment of the invention as applied to the longitudinal welding of tubing with a butt weld.

Referring to the drawings in further detail, a length of tubing is indicated in FIG. 1 at 10, being rapidly advanced (as by known means, not shown) past a weld point w between a pair of squeeze rollers as at 11, 12, where the edges 13 and 14 of a V-shaped longitudinal gap 15 in the tubing becomes closed.

An induction heating coil 16 (which may have one or a plurality of turns) is mounted upon its end connections 17, 18 (or otherwise) at a position shortly in advance of the weld point within the tubing and with its turn or turns circumferentially extending in closely-spaced coupling relationship to the interior wall surfaces of the tubing. The induction heating coil conductor should, of course, be fluid-cooled in the usual way as by being made in the form of a length of metal tubing, preferably non-ferrous, but carrying a stream of suitable cooling fluid, and the ends or terminals of the coil may extend up through the gap 15 and be connected to a suitable source of high frequency current, as indicated at 20.

Preferably current of a frequency of the order of 100,000 cycles per second, or usually considerably higher, for example up to 400,000 cycles or higher, may be used, although in some cases the invention is well adapted to the use of lower frequencies, down to the neighborhood of 10,000 cycles, for example, as often heretofore used for induction heating.

Figure 2:
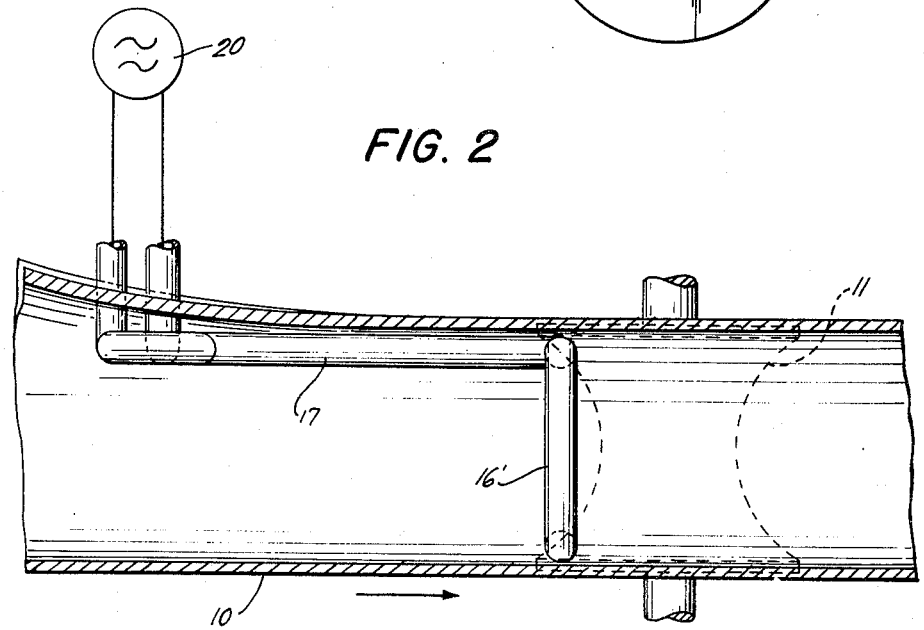
FIG. 2 is a vertical sectional view of the embodiment of FIG. 1.

From FIGS. 1 and 2, it will be noted that the internal coil may be readily placed at a location inside the tubing, so close to the weld point that if a corresponding coil were desired to be placed outside the tubing, that would be impossible because of the presence of the approaching peripheries of the squeeze rollers 11 and 12. And even if such an external coil were placed back from the weld point far enough to afford mechanical clearance with respect to the squeeze rollers, it still might be so close that wasteful currents and consequent wasteful heating would be caused in portions of the squeeze rolls.

Figure 3:
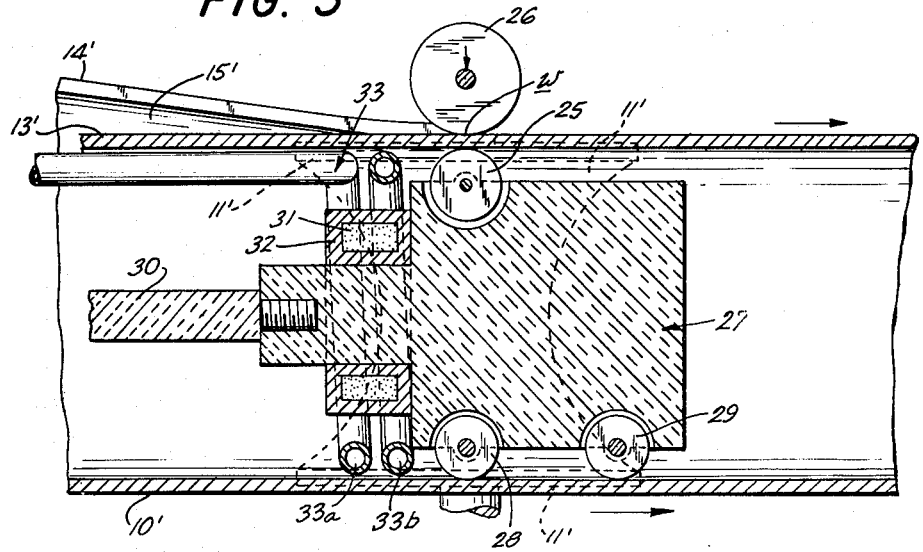
FIG. 3 is a vertical sectional view of an alternative embodiment of the invention, wherein provision is made for lap welding a longitudinal seam in the tubing in accordance with the invention, and utilizing, if desired, an internal impeder arrangement.
Figure 4:
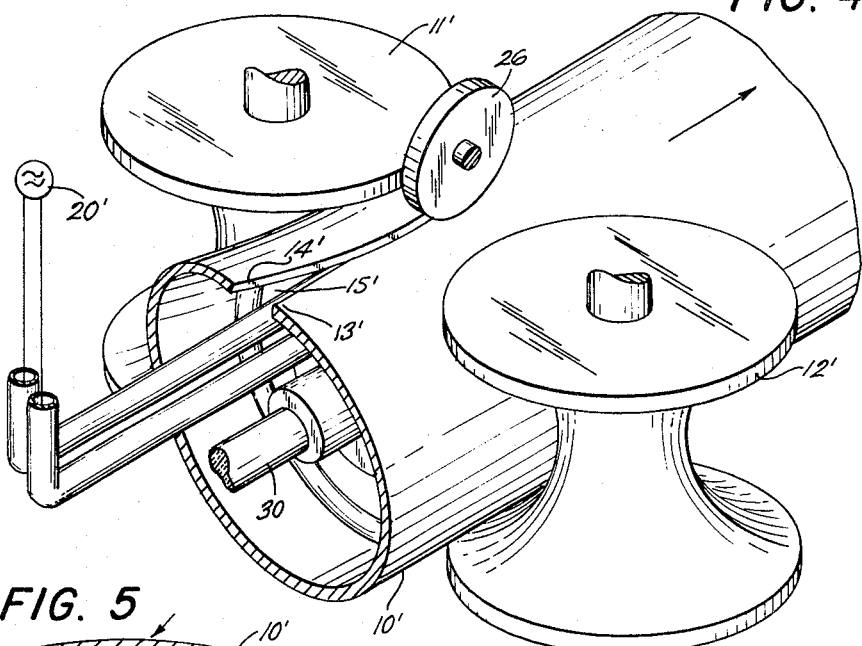
FIG. 4 is a perspective view of the embodiment of FIG. 3.
Figure 5:
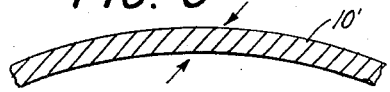
FIG. 5 is a sectional view indicating the formation at the weld line of a mash lapped weld as obtainable with the embodiment of FIGS. 3 and 4.

With the embodiment shown in FIG. 3, tubing, as indicated at 10', is being advanced past a weld point w located between a pair of side squeeze rollers as at 11' and 12' and with this embodiment, the tube metal is so shaped by known means prior to arrival at the heating zone, that the edges 13', 14' at the V-shaped gap 15' will fall into somewhat overlapped relation. And at the weld point, internal and external rollers 25 and 26 respectively are positioned to engage under pressure the upper and lower surfaces of the spot where welding occurs and preferably with sufficient pressure to squeeze the hot metal here to a flattened condition and, if desired, down to a thickness equal to the thickness of one of the edge portions alone. Thereby the internal and external surfaces at the weld region may be made smooth and the line of the weld will extend diagonally through the metal in the direction indicated by the arrows as shown in FIG. 5. For these purposes the upper roller 26 may be suitably mounted with means to apply pressure in a downward direction indicated by the arrow at the middle of the roller 26 in FIG. 3. The underneath roller 25 may be held up firmly against the interior at the spot of welding as by suitable carriage means indicated generally at 27, and having, if desired, supporting means in the form of rollers 28 and 29 at its lower side. The carriage means may be held in stationary position within the tubing by suitable mandrel means of insulation material as at 30, extending back to a point where same may be readily supported where the gap in the tubing is wide enough to permit.

The carriage means 27, if desired, may also carry impeder means as at 31, enclosed in suitable insulation housing means as at 32, mounted on the carriage 27. Such impeder may be of an annular configuration coaxial with the internal induction heating coil 33, which may have a plurality of turns, two turns being here shown as at 33a, 33b, having lead connections similar to those described in connection with FIGS. 1 and 2. This coil may be supported thereby to surround the impeder casing 32. The impeder is formed of a suitable known magnetic material of a non-conducting nature, having a low loss factor, high volume resistivity and magnetic permeability substantially greater than unity. Provision (not shown) should ordinarily be made for internally fluid cooling the carriage arrangement 27 and adjacent parts.

In accordance with both embodiments of the invention above described, the high frequency current will be substantially confined to a path described as follows. Starting, for example, from a point above the induction coil on one of the gap edges, the current extends circumferentially around on the inside surface of the tubing to the other gap edge, thence along that edge to the weld point and from the weld point back along the other gap edge to the starting point. Because of the conditions of mutual inductance between the flows of current on the opposed surfaces of the gap edges, the currents thereon will be closely confined to the gap edge surfaces and extend well over the depth or width of such opposed edge surfaces, heating same up to welding temperature when the weld point is reached, where the current is most concentrated because of the notch effect and where the temperature is highest. The current on the gap edges, as well as that which circumferentially flows in a path around on the inside surface of the tubing, will have a depth of penetration into the metal confined to the so-called "reference depth," as degned in the above-mentioned patent to Kohler No. 3,037,105. Such reference depths for various metals are given in Table I of that patent.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding together the edge portions of a longitudinal gap in metal tubing, which comprises: rapidly advancing said tubing longitudinally thereof while applying rollers to bring said edge portions together at a welding point and while maintaining said portions in separated relation in advance of said welding point with a V-shaped gap therebetween having its apex substantially at said point; and inducing internally in the tubing in advance of the welding point a flow of high frequency electrical current which follows a path starting from one edge portion of said gap at a point in advance of the welding point and extending around circumferentially on the inside wall surface of the tubing to the other edge of said gap, thence along on the other edge portion to the welding point, thence along said one edge portion from the welding point to the starting point, the high frequency current induced in the tubing at the regions shortly in advance of the welding point being substantially confined to the current thus internally induced and flowing along said path and within the reference depth of penetration therefor in the metal of said path and serving to heat the gap edge surfaces up to welding temperature upon reaching the welding point.

2. Method for welding together the edge portions of a longitudinal gap in metal tubing, which comprises: advancing said tubing longitudinally thereof while applying rollers to opposite sides of the tubing to bring said edge portions together at a welding point and while maintaining said portions in separated relation in advance of said welding point with a V-shaped gap therebetween having its apex substantially at said point; and inducing internally of the tubing high frequency current therein for heating the gap edge surfaces up to welding temperature upon reaching the welding point, by mounting internally of the tubing an induction heating coil connected to a source of high frequency current and at a distance so closely in advance of the welding point that a coil of like cross-section, if mounted externally of the tubing at the same distance from the welding point, would not have clearance with respect to peripheral portions of said rollers as same approach the welding region.

3. Method for welding together the edges of a longitudinal gap in metal tubing which comprises: longitudinally advancing the tubing while applying rollers at opposite sides thereof to bring the gap edges together at a welding point as a narrow V-shaped formation, and while heating by high frequency current the approaching gap edges up to welding temperature upon reaching such weld point at the vertex of said gap, said heating being accomplished by internally inducing current on the interior of said tubing and of the gap by an induction heating coil connected to a source of high frequency current and located within the tubing at a region so closely in advance of the welding point as to be in a position extending substantially into the space located between peripheral portions of the said rollers as said peripheral portions approach the welding region.

4. Apparatus for welding together the edges of a longitudinal gap in metal tubing comprising in combination: means for longitudinally advancing the tubing while bringing the opposite sides of the gap together at a welding point in a narrow V-shaped formation, said means including rollers at opposite sides of the tubing; an induction heating coil mounted internally of the tubing at a location shortly in advance of the weld point; and a source of high frequency current connected to said coil, said coil being mounted at a region so closely in advance of the welding point as to be in a position extending substantially into the space located between peripheral portions of said rollers as said peripheral portions approach the welding region.

5. Apparatus for welding together the edges of a longitudinal gap in metal tubing comprising in combination: means for longitudinally advancing the tubing while bringing the opposite sides of the gap together at a welding point in a narrow V-shaped formation, said means including rollers at opposite sides of the tubing; an induction heating coil mounted internally of the tubing at a location shortly in advance of the weld point; a source of high frequency current connected to said coil; and an impeder mounted within said coil and formed of non-conducting magnetic material having a low loss factor and high volume resistivity.

6. Apparatus for welding together the edges of a longitudinal gap in metal tubing comprising in combination: means for longitudinally advancing the tubing while bringing the opposite sides of the gap together in a lapped relation at a welding point and in a narrow V-shaped formation, said means including rollers at opposite sides of the tubing; an induction heating coil located internally of the tubing at a location shortly in advance of the weld point; a source of high frequency current connected to said coil; a cooperating pair of rollers located respectively externally and internally of the welding point for there compressing the region of said point to a flattened condition; and a carriage mounted within the tubing and on which said coil and said internally located roller are supported.

7. Apparatus in accordance with the foregoing claim 6 and in which an impeder of non-conducting magnetic material is supported on said carriage.

References Cited by the Examiner
UNITED STATES PATENTS

| | | | |
|---|---|---|---|
| 2,632,079 | 3/53 | Body | 219—8.5 |
| 2,666,831 | 1/54 | Seulen et al. | 219—8.5 |
| 2,763,756 | 9/56 | Rudd et al. | 219—9.5 |
| 3,037,105 | 5/62 | Kohler | 219—8.5 |

RICHARD M. WOOD, *Primary Examiner.*